(12) United States Patent
Cheng

(10) Patent No.: US 8,936,370 B2
(45) Date of Patent: Jan. 20, 2015

(54) LENS COVER MODULE

(75) Inventor: Tung-Yao Cheng, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 293 days.

(21) Appl. No.: 13/480,794

(22) Filed: May 25, 2012

(65) Prior Publication Data

US 2013/0163083 A1  Jun. 27, 2013

(30) Foreign Application Priority Data

Dec. 23, 2011 (TW) .............................. 100148403 A

(51) Int. Cl.
*G02B 23/16* (2006.01)
*G02B 11/04* (2006.01)

(52) U.S. Cl.
CPC ..................... *G02B 23/16* (2013.01)
USPC ......................................... 359/511; 359/507

(58) Field of Classification Search
CPC .. G02B 27/0006; G02B 13/0045; G02B 7/02; G03B 11/04; G03B 11/041; G03B 21/145
USPC ................ 359/511, 611; 439/607.24, 607.25; 396/448
See application file for complete search history.

(56) References Cited

U.S. PATENT DOCUMENTS

| 2006/0208576 | A1* | 9/2006 | Tseng et al. | 307/113 |
| 2007/0002440 | A1* | 1/2007 | Miyagawa et al. | 359/461 |
| 2007/0253705 | A1* | 11/2007 | Ho | 396/448 |
| 2010/0054801 | A1* | 3/2010 | Kitamura et al. | 399/114 |

FOREIGN PATENT DOCUMENTS

TW            512255        12/2002

* cited by examiner

*Primary Examiner* — William Choi
*Assistant Examiner* — Sharrief Broome
(74) *Attorney, Agent, or Firm* — Tracy M. Heims; Apex Juris, pllc

(57) ABSTRACT

A lens cover module includes a rail member, a lens cover movably mounted on the rail member, a first driving device, and a second driving device. The lens cover reciprocates between a first position where the lens cover covers the lens, and a second position, where the lens cover uncovers the lens. The first driving device moves the lens cover from the first position to a third position, and moves the lens cover from the second position to a fourth position. After the first driving device, the second driving device keeps moving the lens cover to the second position from the third position, or moving the lens cover to the first position from the fourth position.

11 Claims, 6 Drawing Sheets

LENS COVER MODULE

BACKGROUND OF THE INVENTION

1. Field of the Invention

The present invention relates generally to an image device, and more particularly to a lens cover module.

2. Description of the Related Art

With advancement in image technology, image devices, such as video camera, camera, and projector, are widely used in ordinary home life. For example, projector is one of the most popular machines used in business, education, and home life.

The image device usually is provided with a lens to catch images or project image. The quality of image will be poor when the lens is scratched or covered by dust. Typically, the conventional lens cover engages a front end of the lens and will be manually taken off that user always searches for the lens cover if he/she forgot where to put it.

Taiwan patent 512255 taught a power lens cover, in which the image device has a built-in lens cover to be moved by a motor. The lens cover cannot be taken off from the image device, but it is very complex and is hard to repair. Besides, the motor will make noise when it moves the lens cover, and the lens cover will close only when the power is turned on again, and this will affects user to conveniently use the image device.

SUMMARY OF THE INVENTION

The primary objective of the present invention is to provide a lens cover module, which uses a simple structure to open or close the lens cover.

According to the objective of the present invention, the present invention provides lens cover module for covering or uncovering a lens, including a rail member, a lens cover movably mounted on the rail member, a first driving device, and a second driving device. The lens cover reciprocates between a first position where the lens cover covers the lens, and a second position where the lens cover uncovers the lens. The first driving device moves the lens cover from the first position to a third position, and moves the lens cover from the second position to a fourth position. Both the third and the fourth position are between the first position and the second position. The second driving device moves the lens cover from the third position to the second position after the first driving device moves the lens cover from the first position to the third position, and moves the lens cover from the fourth position to the first position after the first driving device moves the lens cover from second the position to the fourth position.

In an embodiment, the first driving member has a least a magnetic driven member on the lens cover and at least a magnetic member so that the magnetic member generates a magnetic field to drive the magnetic driven member to move the lens cover.

In an embodiment, the magnetic driven member has a first magnetic driven member and a second magnetic driven member so that the magnetic member generates a magnetic field to drive the first magnetic driven member to move the lens cover from the first position to the third position, or the magnetic member generates a magnetic field to drive the second magnetic driven member to move the lens cover from the second position to the fourth position.

In an embodiment, the magnetic member a first magnetic member and a second magnetic member so that the first magnetic member generates a magnetic field to drive the first magnetic driven member to move the lens cover from the first position to the third position, and the second magnetic member generates a magnetic field to drive the second magnetic driven member to move the lens cover from the second position to the fourth position.

In an embodiment, the lens cover module further includes a controller electrically connected to the first magnetic member and the second magnetic member to control the first magnetic member or the second magnetic member to generate the magnetic field.

In an embodiment, the magnetic member has a first magnetic member and a second magnetic member so that the first magnetic member generates a magnetic field to drive the magnetic driven member to move the lens cover from the first position to the third position, and the second magnetic member generates a magnetic field to drive the magnetic driven member to move the lens cover from the second position to the fourth position.

In an embodiment, the lens cover module further provides a controller electrically connected to the first magnetic member and the second magnetic member to control the first magnetic member or the second magnetic member to generate the magnetic field.

In an embodiment, the lens cover module further provides at least a detection device to sense whether the lens cover arrives the third position or arrives the fourth position.

In an embodiment, the detection device includes a first detection device to sense whether the lens cover arrives the third position and a second detection device to sense whether the lens cover arrives the fourth position.

In an embodiment, the first driving device stops to move the lens cover when the detection device senses the lens cover at the third position, and the second driving device takes over to move the lens cover to the second position.

In an embodiment, the first driving device stops to move the lens cover when the detection device senses the lens cover at the fourth position, and the second driving device take over to move the lens cover to the first position.

In an embodiment, the rail member has a rail and a slider movably mounted on the rail, and the lens cover is connected to the slider to move on the rail.

In an embodiment, the second driving device is a torsional spring having opposite ends pivoted on the slider and the rail.

DETAILED DESCRIPTION OF THE INVENTION

Figure 1:
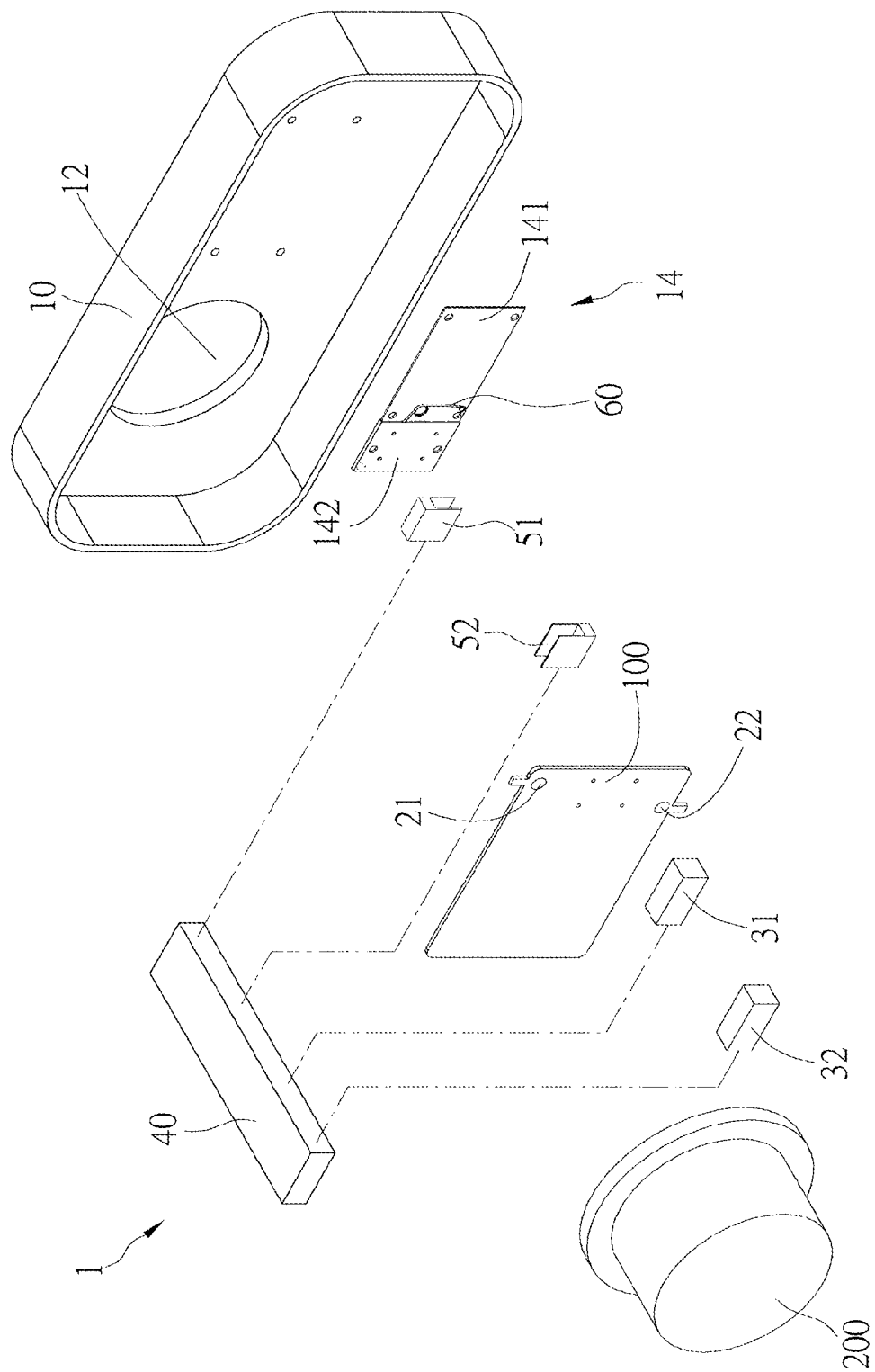
FIG. 1 is an exploded view of a preferred embodiment of the present invention.
Figure 2:
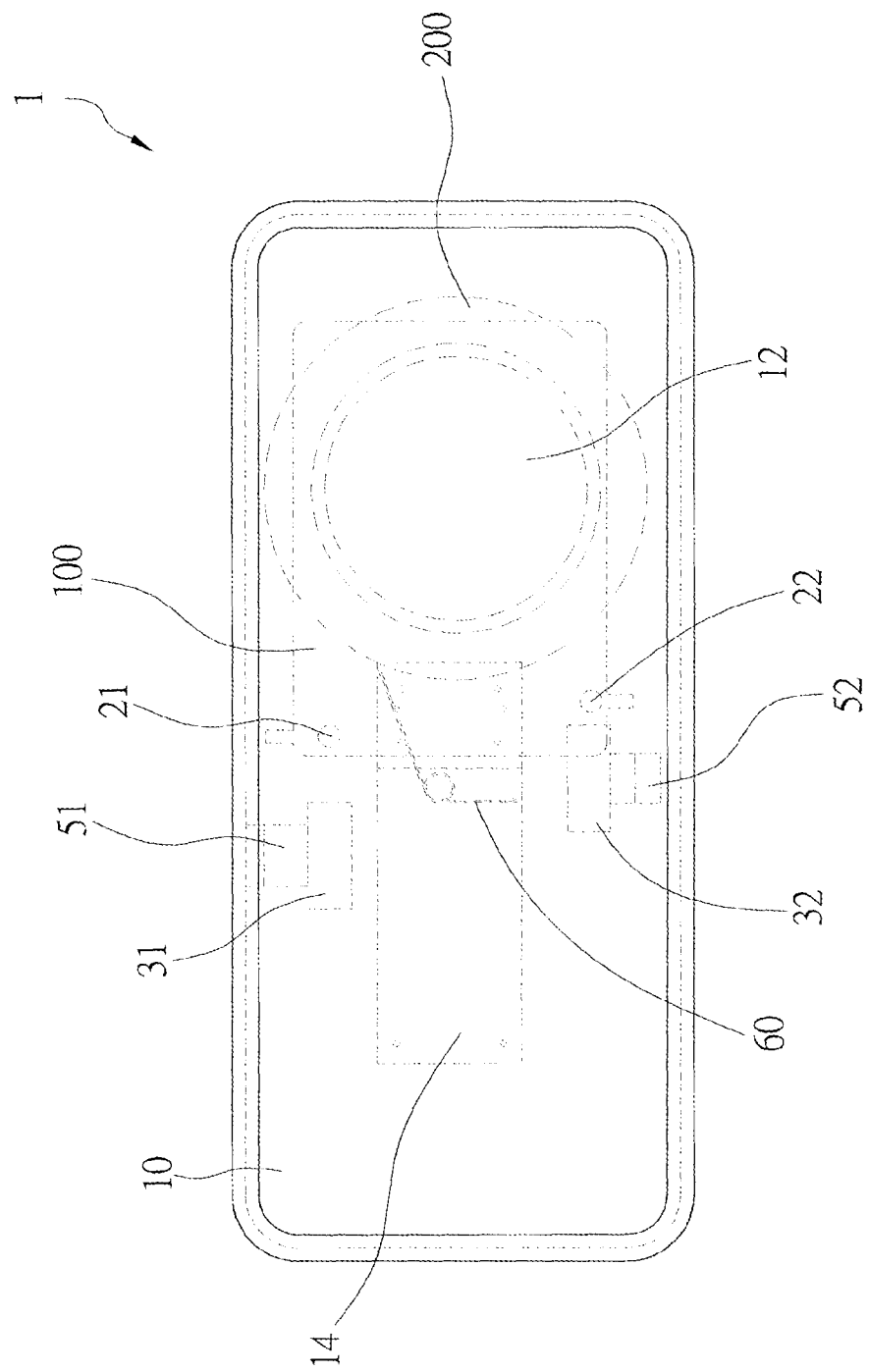
FIG. 2 is a sketch diagram of the preferred embodiment of the present invention, showing the lens cover at the first position.
Figure 3:
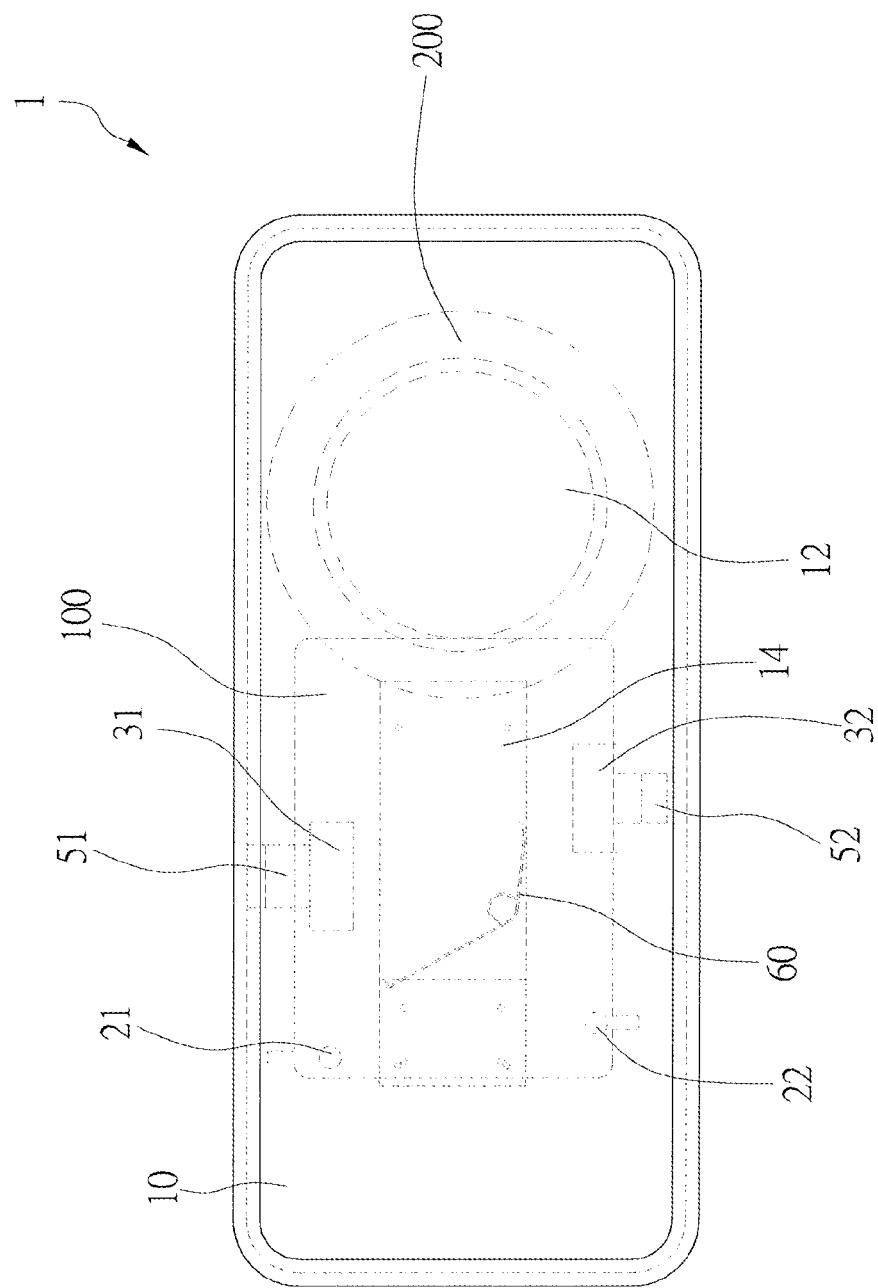
FIG. 3 is a sketch diagram of the preferred embodiment of the present invention, showing the lens cover at the second position.

As shown in FIGS. from FIG. 1 to FIG. 3, a lens cover module 1 for shielding or unshielding a lens 200 includes a case 10, a rail member 14, the lens cover 100, a driving device, a controller 40, and first and second detection devices 51, 52.

The case 10 has an opening 12 aligned with the lens 200.

Figure 4:
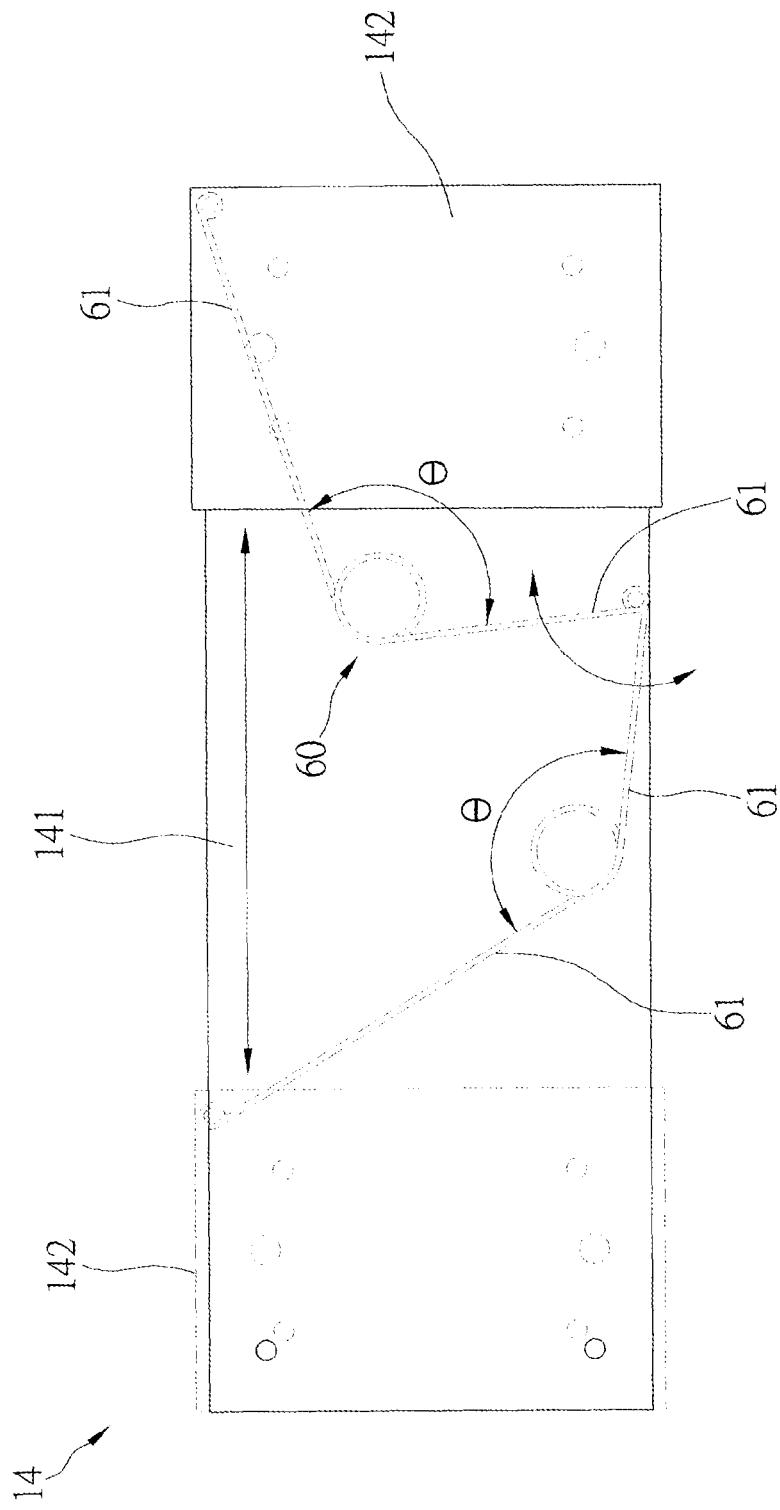
FIG. 4 shows the rail member and the second driving device of the preferred embodiment of the present invention.

The rail member 14 is mounted on the case 10 beside the opening 12. As shown in FIG. 4, the rail member 14 includes a rail 141, a slider 142 movably mounted on the rail 141.

The lens cover 100 engages slider 142 of the rail member 14 to reciprocate along the rail 141 between a first position (FIG. 2) where the lens cover 100 is in front of the lens 200 to cover the lens 200 and a second position (FIG. 3) where the lens cover 100 is removed from the lens 200 to expose the lens 200. In the first position, the lens cover 100 is between the opening 12 and the lens 200 to shield the opening 12.

The driving device includes a first driving member and a second driving member 60. The first driving member has first and second magnetic driven members 21, 22 and first and second magnetic members 31, 32. The first and the second magnetic driven members 21, 22 are mounted on the lens cover 100. In the present invention, the first and the second magnetic driven members 21, 22 are iron plates. In practice, the magnetic driven members 21, 22 may be anything that can be driven by magnetic force, such as magnets.

The first and the second magnetic members 31, 32 are mounted on the case 10. The first magnetic member 31 generates a magnetic field to drive the first magnetic driven member 21 to move the lens cover 100 to a third position from the first position. The third position is between the first position and the second position, and is closer to the second position. The second magnetic member 32 generates a magnetic field to drive the second magnetic driven member 22 to move the lens cover 100 to a fourth position from the second position. The fourth position is between the first position and the second position, and is closer to the first position. In the present invention, the first and the second magnetic members 31, 32 are electromagnets, and they are not limited in electromagnets. The magnetic members in the present embodiment may use any device or element which generates magnetic force or power.

The second driving member 60 is connected to the rail member 14 to take over the first driving member to move the lens cover 100 to the first position from the fourth position or to the second position from the third position.

In the present invention, the second driving member 60 is a torsional spring, as shown in FIG. 4. The second driving member 60 has two arms 61, and distal ends of the arms 61 are pivoted on the rail 141 and the slider 142 respectively. An angle between the arms 61 is θ. The second driving member 60 is moved through swinging, and the angle θ increases or decreases by the press of the arms 61 when they are moving or the recovery of spring force to move the slider 142.

When the lens cover 100 is moved from the first position to the second position, the first driving member moves the lens cover 100 to the third position from the first position first, and then the second driving member 60 takes over to move the lens cover 100 to the second position, and keep the lens cover 100 at the second position. On the contrary, when the lens cover 100 is moved from the second position to the first position, the first driving member moves the lens cover 100 to the fourth position from the second position first, and then the second driving member 60 takes over to move the lens cover 100 to the first position, and keep the lens cover 100 at the first position.

The controller 40 is electrically connected to the first and the second magnetic members 31, 32 to supply power to the first magnetic member 31 or the second magnetic member 32 that the magnetic member 31 or 32 may generate the magnetic field to move the lens cover 100.

The detection devices 51, 52 are mounted on the case 10 and electrically connected to the controller 40. The first detection device 51 detects whether the lens cover 100 has arrived the third position, and the second detection device 52 detects whether the lens cover 100 has arrived the fourth position. In the present invention, the detection devices 51, 52 are photo switches to sense the location of the lens cover 100. When the lens cover 100 arrives the third position and is detected by the first detection device 51 (FIG. 4), the controller 40 cuts the power supplying to the first magnetic member 31. Accordingly, when the lens cover 100 arrives the fourth position and is detected by the second detection device 52 (FIG. 5), the controller 40 cuts the power supplying to the second magnetic member 32.

As shown in FIG. 2, FIG. 4, and FIG. 3, when user wants to open the lens cover 100, which means to move the lens cover 100 from the first position to the second position, the controller 40 supplies power to the first magnetic member 31 to make it generate a magnetic field to drive the first magnetic driven member 21 on the lens cover 100. Therefore, the lens cover 100 will be moved toward the third position, and the second driving member 60 will be compressed during the movement. When the lens cover 100 arrives the third position and the first detection device 51 detects it, the controller 40 cuts the power supplying to the first magnetic member 31 that the first magnetic member 31 no longer has power to move the lens cover 100. At the same time, the second driving member 60 will release its spring force to move the lens cover 100 from the third position to the second position. The second driving member 60 still urges the lens cover 100 when it arrives the second position to keep the lens cover 100 at the second position. Consequently, the lens cover 100 is moved from the first position to the second position to expose the lens.

Figure 5:
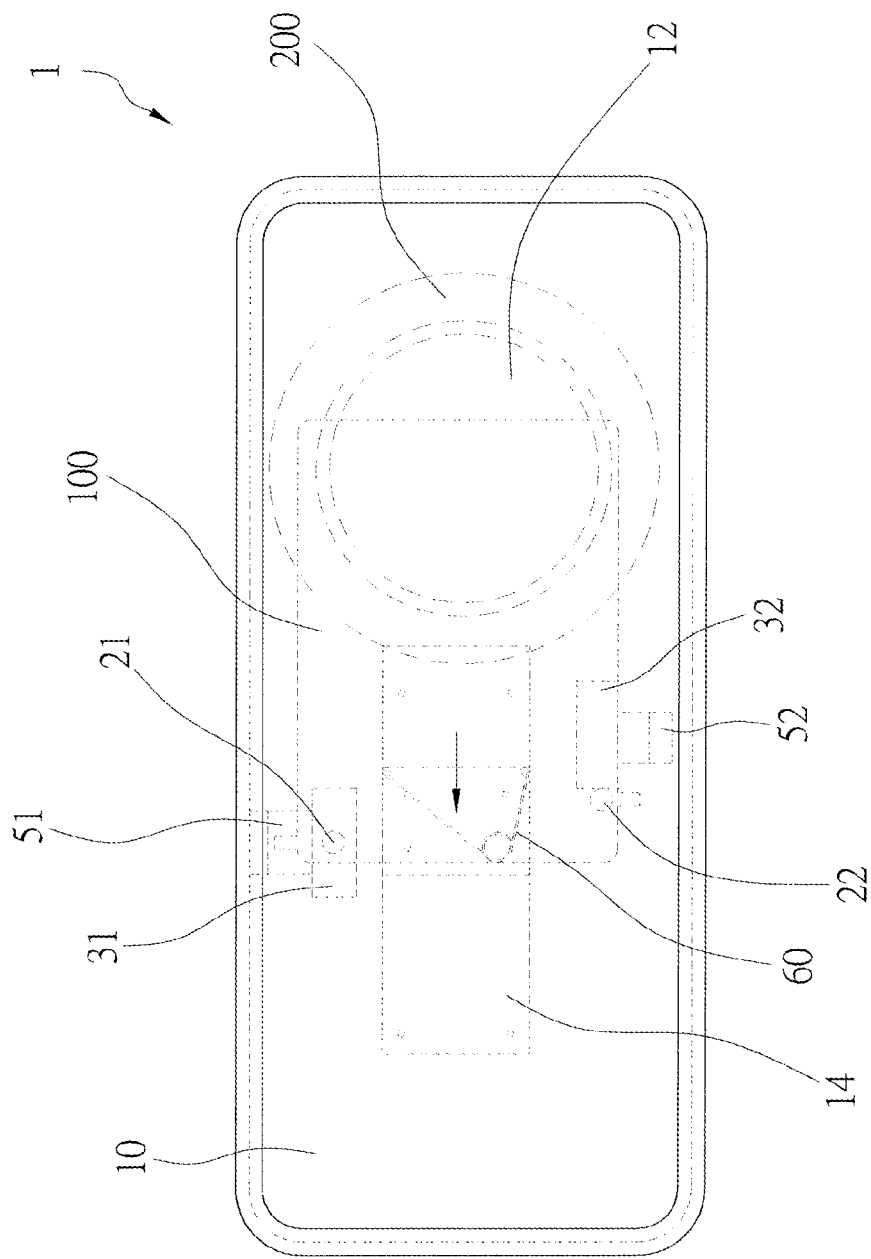
FIG. 5 is a sketch diagram of the preferred embodiment of the present invention, showing the lens cover moving from the first position toward the second position.
Figure 6:
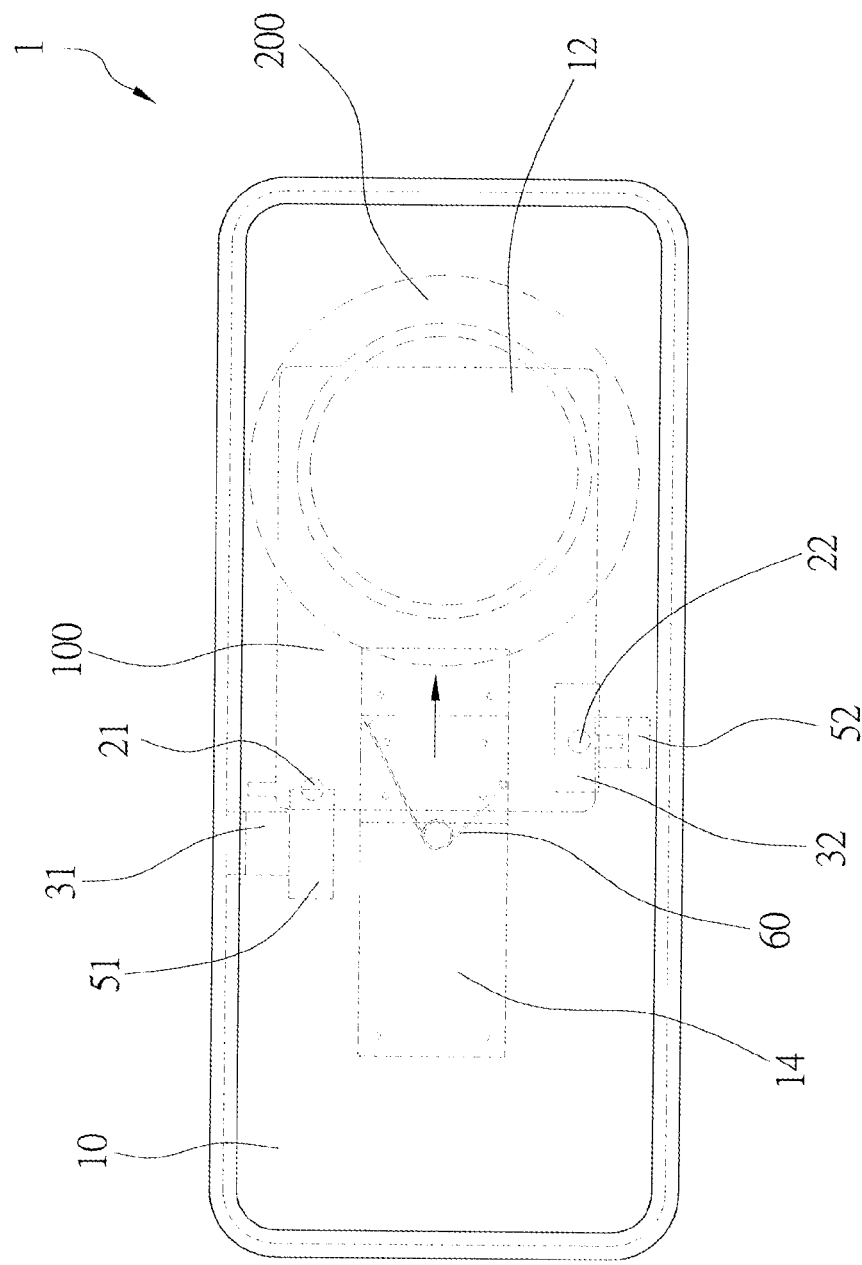
FIG. 6 is a sketch diagram of the preferred embodiment of the present invention, showing the lens cover moving from the second position toward the first position.

As shown in FIG. 3, FIG. 5, and FIG. 2, when user wants to close the lens cover 100, which means to move the lens cover 100 from the second position to the first position, the controller 40 supplies power to the second magnetic member 32 to make it generate a magnetic field to drive the second magnetic driven member 22 on the lens cover 100. Therefore, the lens cover 100 will be moved toward the fourth position, and the second driving member 60 will be compressed during the movement. When the lens cover 100 arrives the fourth position and the second detection device 52 detects it, the controller 40 cuts the power supplying to the second magnetic member 32 that the second magnetic member 32 no longer has power to move the lens cover 100. At the same time, the second driving member 60 will release its spring force to move the lens cover 100 from the fourth position to the first position. The second driving member 60 still urges the lens cover 100 when it arrives the first position to keep the lens cover 100 at the first position. Consequently, the lens cover 100 is moved from the second position to the first position to cover the lens.

Consequently, the present invention provides a simple lens cover module 1 to open and close the lens cover 100. The lens cover module 1 of the present invention may function without power. User only has to move the lens cover 100 by hand to the third or the fourth position, and then the second driving member 60 will do the rest to open or close the lens cover 100. It won't bother the user to use the image device when no power is supplied to the lens cover module 1.

In the preferred embodiment, the first driving member is not limited in using a plurality of iron plates and electromagnets, it may use the design of one or more magnet and electromagnet to move the lens cover by changing polarity of the electromagnet to attract or repulse the magnet. There still are several ways to move the lens cover except using magnetic force, such as motor and gear box, manipulation, or others. The detection device may use infrared ray switch, microswitch, or others. The torsional spring may be replaced by spring, rubber, or other elastic members. The description above is a few preferred embodiments of the present invention and the equivalence of the present invention is still in the scope of claim construction of the present invention.

What is claimed is:

1. A lens cover module for covering or uncovering a lens, comprising:
    a rail member;
    a lens cover movably mounted on the rail member to reciprocate between a first position where the lens cover covers the lens, and a second position where the lens cover uncovers the lens;
    a first driving device moving the lens cover from the first position to a third position, which is between the first position and the second position, and moving the lens cover from the second position to a fourth position, which is between the first position and the second position; and
    a second driving device moving the lens cover from the third position to the second position after the first driving device moves the lens cover to the third position, and moving the lens cover from the fourth position to the first position after the first driving device moves the lens cover to the fourth position;
    wherein the first driving member has at least a magnetic driven member on the lens cover and at least a magnetic member so that the magnetic member generates a magnetic field to drive the magnetic driven member to move the lens cover;
    wherein the rail member has a rail and a slider movably mounted on the rail, and the lens cover is connected to the slider to move on the rail;
    wherein the second driving device is a torsional spring having opposite ends pivoted on the slider and the rail;
    wherein the second driving device is compressed when the lens cover is moving from the first position to the third position, and is released when lens cover is moving from the third position to the second position;
    wherein the second driving device is compressed when the lens cover is moving from the second position to the fourth position, and is released when lens cover is moving from the fourth position to the first position; and
    wherein the second driving device swings when the lens cover is moved between the first position and the second position.

2. The lens cover module as defined in claim 1, wherein the magnetic driven member has a first magnetic driven member and a second magnetic driven member so that the magnetic member generates a magnetic field to drive the first magnetic driven member to move the lens cover from the first position to the third position, or the magnetic member generates a magnetic field to drive the second magnetic driven member to move the lens cover from the second position to the fourth position.

3. The lens cover module as defined in claim 2, wherein the magnetic member has a first magnetic member and a second magnetic member so that the first magnetic member generates a magnetic field to drive the first magnetic driven member to move the lens cover from the first position to the third position, and the second magnetic member generates a magnetic field to drive the second magnetic driven member to move the lens cover from the second position to the fourth position.

4. The lens cover module as defined in claim 3, further comprising a controller electrically connected to the first magnetic member and the second magnetic member to control the first magnetic member or the second magnetic member to generate the magnetic fields.

5. The lens cover module as defined in claim 1, wherein the magnetic member has a first magnetic member and a second magnetic member so that the first magnetic member generates a magnetic field to drive the magnetic driven member to move the lens cover from the first position to the third position, and the second magnetic member generates a magnetic field to drive the magnetic driven member to move the lens cover from the second position to the fourth position.

6. The lens cover module as defined in claim 1, further comprising a controller electrically connected to the magnetic member to control the magnetic member to generate the magnetic field.

7. The lens cover module as defined in claim 1, further comprising at least a detection device to sense whether the lens cover arrives to the third position or arrives to the fourth position.

8. The lens cover module as defined in claim 7, wherein the detection device includes a first detection device to sense whether the lens cover arrives to the third position and a second detection device to sense whether the lens cover arrives to the fourth position.

9. The lens cover module as defined in claim 7, wherein the first driving device stops to move the lens cover when the detection device senses the lens cover at the third position, and the second driving device takes over to move the lens cover to the second position.

10. The lens cover module as defined in claim 7, wherein the first driving device stops to move the lens cover when the detection device senses the lens cover at the fourth position, and the second driving device takes over to move the lens cover to the first position.

11. The lens cover module as defined in claim 1, wherein a speed of the lens cover moving from the first position to the third position is slower than that from the third position to the second position, and a speed of the lens cover moving from the second position to the fourth position is slower than that from the fourth position to the first position.

* * * * *